(12) United States Patent
Lee et al.

(10) Patent No.: US 7,932,693 B2
(45) Date of Patent: Apr. 26, 2011

(54) SYSTEM AND METHOD OF CONTROLLING POWER TO A NON-MOTOR LOAD

(75) Inventors: Kevin Lee, Menomonee Falls, WI (US);
Jyrki K. Ahlgren, Franksville, WI (US);
Ian T. Wallace, Whitefish Bay, WI (US);
Thomas M. Doring, Grafton, WI (US)

(73) Assignee: Eaton Corporation, Cleveland, OH (US)

( * ) Notice: Subject to any disclaimer, the term of this patent is extended or adjusted under 35 U.S.C. 154(b) by 807 days.

(21) Appl. No.: 11/176,820

(22) Filed: Jul. 7, 2005

(65) Prior Publication Data
US 2007/0007929 A1    Jan. 11, 2007

(51) Int. Cl.
*H02P 27/04* (2006.01)
(52) U.S. Cl. ......... 318/802; 318/701; 318/721; 318/727
(58) Field of Classification Search .............. 318/139,
318/254, 439, 434, 800, 812, 727, 722, 801,
318/807, 805, 625, 569, 802, 701, 721; 363/40,
363/41, 131; 323/205; 388/811, 906
See application file for complete search history.

(56) References Cited

U.S. PATENT DOCUMENTS

| | | | | |
|---|---|---|---|---|
| 4,783,728 A * | 11/1988 | Hoffman | ............ | 363/37 |
| 4,789,998 A * | 12/1988 | Kuehnel | ............ | 378/110 |
| 4,888,461 A * | 12/1989 | Takano et al. | ............ | 219/716 |
| 5,012,172 A * | 4/1991 | Sember | ............ | 318/696 |
| 5,048,033 A * | 9/1991 | Donahue et al. | ............ | 372/38.04 |
| 5,107,438 A * | 4/1992 | Sato | ............ | 702/107 |
| 5,206,575 A * | 4/1993 | Nakamura et al. | ............ | 318/807 |
| 5,226,064 A * | 7/1993 | Yahata et al. | ............ | 378/4 |
| 5,329,221 A * | 7/1994 | Schauder | ............ | 323/207 |
| 5,329,222 A * | 7/1994 | Gyugyi et al. | ............ | 323/207 |
| 5,450,306 A * | 9/1995 | Garces et al. | ............ | 363/41 |
| 5,457,375 A * | 10/1995 | Marcinkiewicz et al. | ..... | 318/802 |
| 5,490,056 A * | 2/1996 | Iwasaki | ............ | 363/97 |
| 5,640,073 A * | 6/1997 | Ikeda et al. | ............ | 318/400.03 |
| 5,703,767 A * | 12/1997 | Stacey | ............ | 363/40 |
| 5,717,585 A * | 2/1998 | Nguyen et al. | ............ | 363/98 |
| 5,724,477 A * | 3/1998 | Webster et al. | ............ | 388/815 |
| 5,790,391 A * | 8/1998 | Stich et al. | ............ | 363/24 |
| 5,844,397 A * | 12/1998 | Konecny et al. | ............ | 318/811 |
| 5,903,128 A * | 5/1999 | Sakakibara et al. | ............ | 318/721 |
| 5,909,098 A * | 6/1999 | Konecny et al. | ............ | 318/811 |
| 6,014,007 A * | 1/2000 | Seibel et al. | ............ | 318/805 |

(Continued)

OTHER PUBLICATIONS

R. D. Lorenz et al., "Motion Control with Induction Motors," IEEE Proceedings special issue on Power Electronics and Motion Control, vol. 82, No. 8, pp. 1215-1240, Aug. 1994.

(Continued)

*Primary Examiner* — Paul Ip
(74) *Attorney, Agent, or Firm* — Ziolkowski Patent Solutions Group, SC

(57) ABSTRACT

A motor drive for conditioning power to be delivered to a non-motor load includes a voltage feedback circuit that monitors a DC bus voltage and, based on changes in the DC bus voltage, adjusts a power conditioning scheme such that near steady-state load conditions are maintained in response to a transient load condition. The voltage feedback circuit has a voltage sensor that provides voltage feedback to a controller that determines what changes in power conditioning are needed in response to a transient load condition that manifests itself in a change in DC bus voltage.

26 Claims, 12 Drawing Sheets

U.S. PATENT DOCUMENTS

| | | | |
|---|---|---|---|
| 6,072,302 A * | 6/2000 | Underwood et al. | 322/17 |
| 6,104,149 A * | 8/2000 | Pelly | 318/400.21 |
| 6,128,204 A * | 10/2000 | Munro et al. | 363/41 |
| 6,175,113 B1 * | 1/2001 | Ashley et al. | 250/334 |
| 6,229,278 B1 * | 5/2001 | Garces et al. | 318/801 |
| 6,239,997 B1 * | 5/2001 | Deng | 363/95 |
| 6,316,918 B1 * | 11/2001 | Underwood et al. | 322/20 |
| 6,380,719 B2 * | 4/2002 | Underwood et al. | 322/36 |
| 6,445,879 B1 * | 9/2002 | Youn et al. | 388/811 |
| 6,466,465 B1 * | 10/2002 | Marwali | 363/41 |
| 6,545,443 B2 * | 4/2003 | Kushida | 318/727 |
| 6,586,904 B2 * | 7/2003 | McClelland et al. | 318/701 |
| 6,603,672 B1 * | 8/2003 | Deng et al. | 363/37 |
| 6,626,002 B1 * | 9/2003 | Notohara et al. | 62/228.4 |
| 6,639,377 B2 * | 10/2003 | Iwaji et al. | 318/700 |
| 6,642,681 B2 * | 11/2003 | Kawabata et al. | 318/431 |
| 6,690,137 B2 * | 2/2004 | Iwaji et al. | 318/700 |
| 6,703,719 B1 * | 3/2004 | McConnell | 290/52 |
| 6,759,826 B2 * | 7/2004 | Tankard | 318/701 |
| 6,768,284 B2 * | 7/2004 | Lee et al. | 318/808 |
| 6,801,019 B2 * | 10/2004 | Haydock et al. | 322/17 |
| 6,807,074 B2 | 10/2004 | Ollila et al. | |
| 6,849,827 B2 * | 2/2005 | Thommes | 219/130.21 |
| 6,917,124 B2 * | 7/2005 | Shetler et al. | 307/66 |
| 6,952,089 B2 * | 10/2005 | Matsuo | 318/811 |
| 6,952,355 B2 * | 10/2005 | Riggio et al. | 363/21.15 |
| 6,975,698 B2 * | 12/2005 | Katcha et al. | 378/15 |
| 7,049,546 B2 * | 5/2006 | Thommes | 219/130.21 |
| 7,102,903 B2 * | 9/2006 | Nakamura et al. | 363/98 |
| 7,109,605 B2 * | 9/2006 | Habu | 307/39 |
| 7,176,648 B2 * | 2/2007 | Choi | 318/625 |
| 7,197,113 B1 * | 3/2007 | Katcha et al. | 378/101 |
| 7,233,873 B2 * | 6/2007 | Moriarty et al. | 702/94 |
| RE40,250 E * | 4/2008 | Kushida | 318/727 |
| 7,372,174 B2 * | 5/2008 | Jones et al. | 290/44 |
| 2001/0008552 A1 * | 7/2001 | Harada et al. | 378/107 |
| 2002/0008492 A1 * | 1/2002 | Nagayama | 318/727 |
| 2002/0031201 A1 * | 3/2002 | Suzuki et al. | 378/4 |
| 2002/0117989 A1 * | 8/2002 | Kawabata et al. | 318/700 |
| 2002/0153857 A1 * | 10/2002 | Iwaji et al. | 318/700 |
| 2002/0163319 A1 * | 11/2002 | Kaneko et al. | 318/727 |
| 2002/0175644 A1 * | 11/2002 | Su | 318/254 |
| 2003/0048006 A1 * | 3/2003 | Shelter et al. | 307/64 |
| 2003/0067278 A1 * | 4/2003 | Nakamura et al. | 318/254 |
| 2003/0155893 A1 * | 8/2003 | Schreiber | 322/12 |
| 2003/0160515 A1 * | 8/2003 | Yu et al. | 307/105 |
| 2003/0214266 A1 * | 11/2003 | Cheng et al. | 318/716 |
| 2004/0017895 A1 * | 1/2004 | Suzuki et al. | 378/146 |
| 2004/0041404 A1 * | 3/2004 | McConnell | 290/52 |
| 2004/0062062 A1 * | 4/2004 | Lee et al. | 363/37 |
| 2004/0113572 A1 * | 6/2004 | Iwaji et al. | 318/254 |
| 2004/0124809 A1 * | 7/2004 | Yin Ho | 318/807 |
| 2004/0183496 A1 * | 9/2004 | Yoshimoto | 318/715 |
| 2004/0195225 A1 * | 10/2004 | Thommes | 219/130.21 |
| 2004/0207475 A1 * | 10/2004 | Minamino et al. | 331/16 |
| 2005/0046380 A1 * | 3/2005 | Matsuo | 318/801 |
| 2005/0068001 A1 * | 3/2005 | Skaug et al. | 318/807 |
| 2005/0162023 A1 * | 7/2005 | Habu | 307/151 |
| 2005/0199604 A1 * | 9/2005 | Thommes | 219/130.21 |
| 2005/0218862 A1 * | 10/2005 | Huggett et al. | 318/722 |
| 2005/0226380 A1 * | 10/2005 | Katcha et al. | 378/101 |
| 2005/0253550 A1 * | 11/2005 | Matsuo et al. | 318/807 |
| 2005/0258795 A1 * | 11/2005 | Choi | 318/625 |
| 2005/0281067 A1 * | 12/2005 | Deng et al. | 363/131 |
| 2006/0043923 A1 * | 3/2006 | Baker et al. | 318/807 |
| 2006/0067655 A1 * | 3/2006 | Okuda et al. | 388/805 |
| 2006/0097180 A1 * | 5/2006 | Spartiotis et al. | 250/370.13 |
| 2006/0108988 A1 * | 5/2006 | McKelvey et al. | 323/205 |
| 2006/0113939 A1 * | 6/2006 | Saren | 318/434 |
| 2006/0245219 A1 * | 11/2006 | Li | 363/89 |
| 2006/0282703 A1 * | 12/2006 | Nam | 714/14 |
| 2007/0029881 A1 * | 2/2007 | Lai | 307/82 |

OTHER PUBLICATIONS

J. Holtz, "Sensorless Control of Induction Motor Drives," IEEE Proceedings, vol. 90, No. 8, pp. 1359-1394, Aug. 2002.

S. Karve, "Three of a Kind," IEE Review, pp. 27-31, Mar. 2000.

L. Gyugyi, "Unified Power-Flow Control Concept for Flexible AC Transmission Systems," IEEE Proceedings-C, vol. 139, No. 4, pp. 323-331, Jul. 1992.

H. Akagi, "New Trends in Active Filters for Power Conditioning," IEEE Trans. On Industry Applications, vol. 32, No. 6, pp. 1312-1322, Nov./Dec. 1996.

S. B. Bekiarov et al., "Uninterruptible Power Supplies: Classification, Operation, Dynamics, and Control," IEEE/APEC 2002, vol. 1, pp. 597-604, Mar. 2002.

S. Ponnaluri et al., "Overriding Individual Harmonic Current Control with Fast Dynamics for UPS with Non-Linear Loads," IEEE International Conference on Power Electronics and Drive Systems, vol. 2, pp. 527-532, Oct. 2001.

M. J. Ryan et al., "Control Topology Options for Single-Phase UPS Inverters," IEEE Trans. On Industry Applications, vol. 33, No. 2, pp. 493-501, Mar./Apr. 1997.

M. J. Ryan et al., "A High Performance Sine Wave Inverter Controller with Capacitor Current Feedback and 'Back-EMF' Decoupling," IEEE PESC Conference Proceedings, pp. 507-513, Atlanta, GA 1995.

Vacon NC Tools Manual, 2005.

* cited by examiner

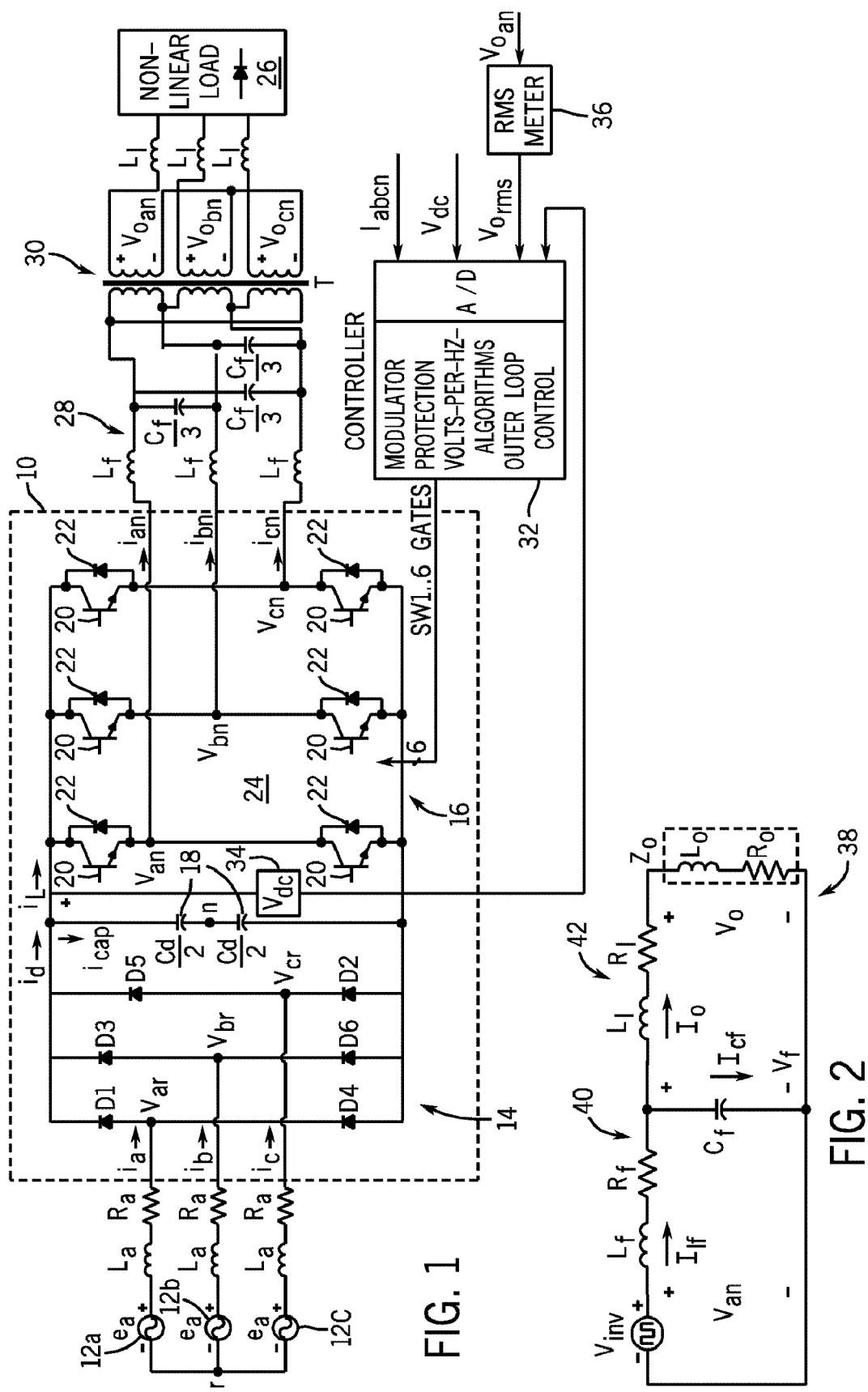

SYSTEM AND METHOD OF CONTROLLING POWER TO A NON-MOTOR LOAD

BACKGROUND OF THE INVENTION

The present invention relates generally to power conditioning and, more particularly, to a system and method of controlling power to a non-motor load using a motor drive.

Motor drives are frequently used in industrial applications to condition power and otherwise control electric driven motors such as those found with pumps, fans, compressors, cranes, paper mills, steel mills, rolling mills, elevators, machine tools, and the like. Motor drives typically provide a volts-per-hertz control and have greatly improved the efficiency and productivity of electric driven motors and applications. Increasingly, motor drives are taking the form of adjustable-speed drives (ASD) that are adept at providing variable speed and/or variable torque control to an electric driven motor. Heretofore, motor drives have been used solely to control or otherwise condition power to a motor load.

Power to non-motor loads is usually controlled through a power conditioner that is specifically designed to handle the transient load conditions that can be encountered. However, current power conditioners often trip, or cause the load to trip, when strict voltage and current constraints are not met. This is increasingly occurring with the power conditioners for medical imaging scanners. That is, medical imaging scanners generally require tight load voltage regulation in steady state together with low total harmonic distortion.

Power conditioners typically include a series of switches, such as IGBTs, that are switched at high frequencies, e.g., 10 kHz, to provide a desired output voltage that is seen by the scanner. Further, power conditioners operate according to a volts-per-hertz profile such that voltage changes can be exacted by varying the switching frequency of the IGBTs or other switch circuit. During normal operating conditions, the controller will change the IGBT switching duty cycles such that a desired output voltage is seen by the scanner. However, because of the poor and finite response time of the RMS voltmeters that provide feedback as to load voltage to the PI controller of the power condition, it can become problematic for the controller to determine and effectuate the appropriate corrective measures in the switching of the IGBTs to prevent failure of the load. In other words, conventional controllers cannot predict load transitions and adjust accordingly.

As previously described, power conditioners for these non-motor loads generally employ an RMS voltmeter. The voltmeter provides voltage feedback to the controller as to voltage changes at the load. While generally successful during near steady-state conditions, the response times of voltmeters are such that transient load conditions cannot be addressed expeditiously. As such, appropriate correction in the power conditioning cannot be timely executed to prevent tripping of the scanner. In short, transient load conditions can cause under-voltage and over-voltage conditions to occur; both of which can cause the non-motor load to fail. These transient conditions are typically encountered at scanner start-up.

That is, when the scanner is OFF, but the power conditioner ON, the scanner is seeing a conditioned voltage from the power conditioner but no current flow is present. When the load is applied, i.e., scanner turned ON, the output voltage of the power conditioner drops, e.g. from 480VDC to 440VDC, and a significant inrush of current is experienced by the scanner. Such a 40V drop can cause the scanner to fail. In other words, the scanner needs minimally more than 440VDC to maintain operation and, as such, when a 40V drop occurs, the scanner can become under-powered and, ultimately, fail—leading to scanner down time, service calls, and the like.

Similarly, the significant inrush of current can cause the scanner or other non-motor load to trip. That is, most scanners include an internal power protection device, such as a circuit breaker, that is designed to prevent damage to the components of the scanner during unexpected current conditions. As such, the inrush of current when the scanner is turned ON, i.e., the load applied, may cause tripping of the scanner's internal breaker. This also results in scanner down time, service calls, and the like.

One proposed solution to prevent load tripping or failure is an uninterruptible power supply (UPS). A line-interactive UPS, while generally effective in load protection, would be connected in parallel as a backup to utility power and cannot provide power for continuous operation of a medical imaging scanner, such as a magnetic resonance (MR), x-ray, or computed tomography (CT) scanner. Additionally, while a double-conversion UPS provides substantial load protection, isolation from upstream distribution systems, wide input voltage tolerances, and load voltage and frequency regulation, such UPS devices are quite costly and generally less efficient than motor drives.

It would therefore be desirable to have a cost-effective system and method of conditioning power for a non-motor load that is rapid in adjusting to transient load conditions such that load failure is avoided.

BRIEF DESCRIPTION OF THE INVENTION

The present invention provides a system and method of controlling power to a non-motor load that overcomes the aforementioned drawbacks.

A motor drive for conditioning power to be delivered to a non-motor load includes a voltage feedback circuit that monitors a DC bus voltage and, based on changes in the DC bus voltage, adjusts a power conditioning scheme such that near steady-state load conditions are maintained in response to a transient load condition. The voltage feedback circuit has a voltage sensor that provides voltage feedback to a controller that determines what changes in power conditioning are needed in response to a transient load condition that manifests itself in a change in DC bus voltage.

Therefore, in accordance with one aspect, the invention includes a motor drive to control power delivery to a load. The motor drive includes a power input and a DC bus connected to the power input. At least one switch is connected to the DC bus. The motor drive further includes a power output connectable to a load. A controller is connected to the DC bus and controls switching of the at least one switch to maintain near steady-state at the load in response to changes in voltage at the DC bus.

In accordance with another aspect of the invention, a power conditioner to supply conditioned power to a load is disclosed. The power conditioner has a rectifier bridge to convert an AC power input to DC power and provide a DC bus voltage. An inverter is connected to the DC bus voltage as is a filter that filters the inverter output and feeds it to a non-motor load. The power conditioner also has a PID controller that receives feedback of the DC bus voltage and regulates the inverter to maintain near steady-state at the non-motor load in response to transient load conditions.

According to another aspect, the invention includes a method of regulating power to a load. The method includes detecting a change in voltage across a DC bus of a motor drive and dynamically controlling switching of a switch array of the motor drive in response to a detected change in voltage across the DC bus such that load voltage regulation is ±1% in steady-state with less then 3% total harmonic distortion.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings:

FIG. 1 is a schematic of a power conditioner including a motor drive, step-up transformer, and PID controller according to one aspect of the invention.

FIG. 2 is a schematic single phase equivalent power circuit diagram according to the present invention.

DETAILED DESCRIPTION OF THE PREFERRED EMBODIMENT

Figure 3:
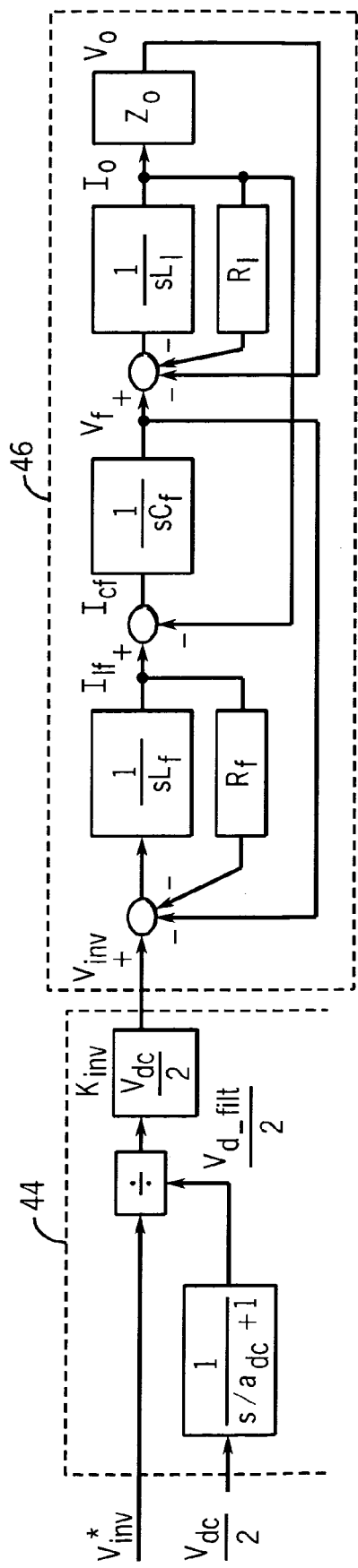
FIG. 3 is a schematic of an inverter and physical plant according to the present invention.
Figure 4:
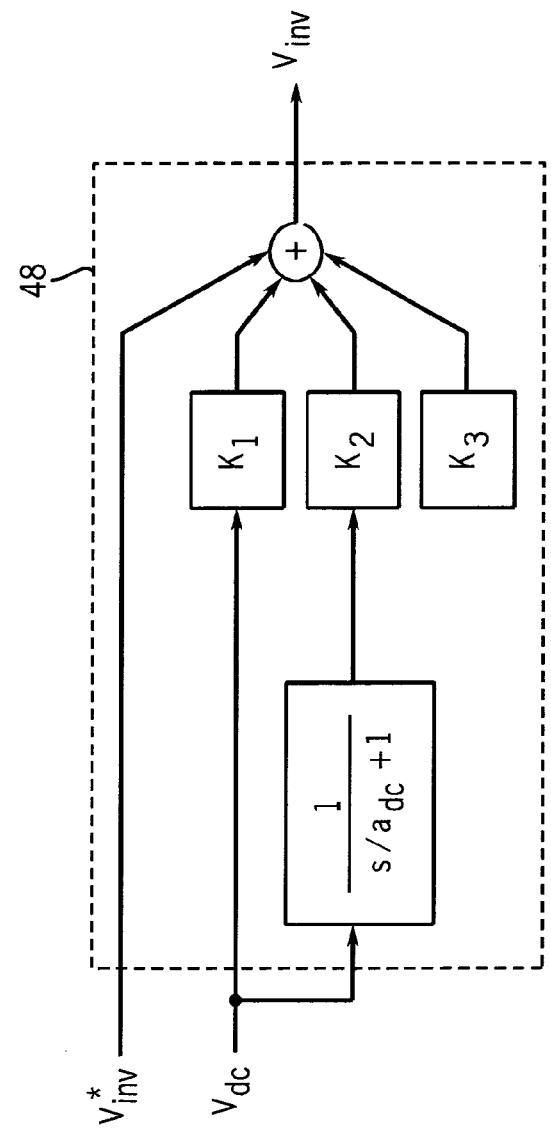
FIG. 4 is a schematic of a linearized inverter according to the present invention.

Referring now to FIG. 1, a power conditioner 8 having an adjustable speed motor drive 10 is shown. The adjustable speed drive (ASD) is designed to receive a three AC power input, rectify the AC input, and perform a DC/AC conversion of the rectified segment into a three-phase alternating voltage of variable frequency and amplitude that is supplied to a load. In a preferred embodiment, the ASD operates according to an exemplary volts-per-hertz characteristic. In this regard, the motor drive provides voltage regulation of ±1% in steady state with less than 3% total harmonic distortion, +0.1 Hz in output frequency, and fast dynamic step load response over a full load range.

In an exemplary embodiment, a three-phase AC input 12a-12c is fed to a three-phase rectifier bridge 14. The input line impedances are equal in all three phases. The rectifier bridge 14 converts the AC power input to a DC power such that a DC bus voltage is present between the rectifier bridge 14 and a switch array 16. The bus voltage is smoothed by a DC bus capacitor bank 18. The switch array 16 is comprised of a series of IGBT switches 20 and anti-parallel diodes 22 that collectively form a PWM inverter 24. The inverter synthesizes AC voltage waveforms with a fixed frequency and amplitude for delivery to the load 26, such as an MR or CT scanner, through LC filter network 28 and step-up transformer 30. In a preferred embodiment, the rectifier bridge sees a 480V input and the inverter 24 provides less than or equal to a 460V output. As such, step-up transformer 30 is used to elevate the load voltage to 480V. That is, the filter network 28 smoothes the output voltage and current waveforms and the low impedance, Delta-Wye step-up transformer provides a boost to allow for longer ride through due to input voltage sags. Operation of the inverter 24 is via controller 32.

Controller 32 is preferably a PID controller and includes a system layer and a programmable application layer. The system layer performs high speed operations such as space-vector modulation, DC bus voltage decoupling, and protection. The system layer also interfaces to the power circuit via gate drive signals and sensing of the DC bus voltage and pole currents. In this regard, the motor drive 10 includes a voltage sensor 34 that provides feedback to the controller 32 of the DC bus voltage. As will be described more fully, changes in DC bus voltage are interpreted as transient load conditions and are used to control switching of the switch array such that near steady-state load conditions are maintained. The application layer is operated at a lower update rate and performs functions such as the sampling of user I/O, executing a volts-per-hertz profile, and reference signal generation.

Load voltage is sensed with a true RMS voltmeter 36 that converts a measured 0-600V signal into a 0-10V reference signal that is fed back to the controller 32 for closed loop voltage control. The load voltage and frequency are preferably regulated to be within ±1% of 480V and ±0.1 Hz at 60 Hz. In light of the relatively slow and finite response time of the RMS voltmeter 36, additional control is achieved using the feedback from DC bus voltage sensor 34. Given the DC bus voltage will experience a change in response to a step load transient condition, feedback from the DC bus provides a derivative term that can be considered by the PID controller to forecast the impact of changing load conditions and, thus, effectuate changes in the PWM control such that near steady-state load conditions are maintained. The motor drive 10 also utilizes active damping techniques to reduce output voltage waveform oscillations. Additionally, while the present invention is particularly well-suited for non-linear, non-motor loads, it is contemplated that the invention may be carried out with linear and/or motor loads. Further, the motor drive is designed to achieve load voltage regulation of ±1% in steady state with less than 3% total harmonic distortion, ±0.1 Hz in output frequency, and fast dynamic step load response over a full load range.

As described above, motor drive 10 operates as a power conditioner and whose operation is controlled by a PID controller. The PID controller receives feedback regarding DC bus voltage and, as such, the motor drive has a closed loop control. In this regard, step changes in the non-motor load can be detected as changes in the DC bus voltage. Moreover, as a result of the rapid response time of the voltage sensor, corrective measures can be taken quickly. In other words, the derivative term provided from the voltage sensor to the PID controller enables the PID controller to detect a trend at the load and develop a corrective measure in the power conditioning such that further trending is prevented and near steady-state load conditions can be maintained. Additionally, because the load voltage typically has a high ripple effect in non-motor applications, deriving the derivative term from the load voltage is not preferred. The high ripple effects in the load voltage create instability in the derivative term and, thus, deriving the derivative term from changes in the DC bus voltage is preferred.

The PID controller generally provides three-way functionality. The PID controller provides proportional, integral, and derivative regulation. As described above, derivative regulation defines the controller's ability to detect trends in load conditions and determine corrective measures rather quickly such that near steady-state conditions are maintained in response to transitions at the load. The proportional functionality of the controller defines the controller's ability to quickly respond to changing operating conditions. In short, the proportional functionality defines the controller's response time. The integral functionality defines the controller's ability to maintain steady-state during non-transient load conditions. In this regard, load voltage feedback from the RMS voltmeter is used by the PID controller during non-transient load conditions to maintain steady-state within a given error threshold.

Referring now to FIGS. 2-15, a theoretical description of the invention will be described as well as simulated and experimental results derived from testing of the power conditioner illustrated in FIG. 1. In FIG. 2, a single-phase equivalent circuit 38 according to the present invention is shown and includes an effective line-neutral inverter voltage ($V_{inv}$), the 3-phase LC filter 40, isolation transformer 42, and load. All parameters were referred to the inverter side of the transformer, and are: the filter inductance and its effective series resistance ($L_f$ and $R_f$), filter capacitor ($C_f$), transformer leakage inductance and its effective series resistance ($L_1$ and $R_1$), and linear load impedance ($Z_0 = R_0 + j\omega L_0$). The load voltage versus inverter transfer function in Eqn. 1 below has a third order characteristic equation. The low frequency gain is less than unity and is a function of the filter, transformer, and load resistance.

$$\frac{V_O}{V_{inv}} = \frac{sL_O + R_O}{s^3 A + s^2 B + sC + D}, \text{ and} \quad \text{(Eqn. 1)}$$

$$\frac{I_{cf}}{V_{inv}} = \frac{s^2 C_f (L_1 + L_O) + s C_f R_O}{s^3 A + s^2 B + sC + D}, \quad \text{(Eqn. 2)}$$

Where:

$$A = C_f L_f (L_1 + L_o)$$

$$B = C_f L_f (R_o + R_l) + C_f R_f (L_o + L_l)$$

$$C = L_f + L_l + L_o + C_f R_f (R_o + R_l)$$

$$D = R_o + R_f + R_l \quad \text{(Eqn. 3)}$$

Referring now to FIG. 3, the inverter modulator 44 and plant 46 are shown in a block diagram, where $V^*_{inv}$ and $V_{dc}$ are the inverter voltage reference and DC bus voltage, respectively. The plant 46 is formed of the LC filter, transformer, and load. The modulator 44 includes a DC bus voltage open loop decoupling scheme to reduce the effect of low frequency variations in the DC bus on the inverter output voltage. As set forth in Eqn. 4, the gain of the three-phase inverter modulator and the power stage is dependent on the DC bus voltage.

$$V_{inv} = \frac{V_{dc}(t)}{2} \cdot V^*_{inv}. \quad \text{(Eqn. 4)}$$

The system layer of the controller includes code to implement a decoupling scheme that uses the filtered DC bus voltage ($V_{d\_filt}$) to normalize the inverter reference ($V^*_{inv}$), the input to the space vector modulator (as shown in Eqn. 5 and FIG. 3).

$$V_{inv} = \frac{V^*_{inv}}{\frac{V_{dc}}{2} \cdot \frac{1}{s/a_{dc}+1}} \cdot \frac{V_{dc}}{2} = \frac{V^*_{inv} \cdot V_{dc}(t)}{V_{d\_filt}(t)}. \quad \text{(Eqn. 5)}$$

For critical non-motor loads, such as medical imaging scanners, output voltage regulation during load step changes is key. As such, the present invention includes a DC bus decoupling scheme. That is, given that actual DC bus voltage ($V_{dc}$) may vary by 6% from full load to no load, a DC bus decoupling scheme was developed to compensate for the 6% voltage drop across the DC bus, and incorporated into the system model.

To consider the effect of DC bus disturbances on the load voltage, a linearized version of the inverter and modulator was developed from Eqn. 6 and a Taylor series expansion around the rated operating point of Eqn. 7. The inputs of $x_1$, $x_2$, and $x_3$ are $V^*_{inv}(t)$, $V_{dc}(t)$, and $V_{d\_filt}(t)$, respectively, and nominal operating conditions are $V^*_{invo}$, $V_{dco}$, $V_{d\_filto}$, represented by $\bar{x}_1, \bar{x}_2, \bar{x}_3$. The resulting linearized inverter modulator 48, Eqn. 8, is also shown in block diagram in FIG. 4.

$$y(t) = V_{inv}(t) = \frac{V^*_{inv}(t) \cdot V_{dc}(t)}{V_{d\_filt}(t)} = f(x_1, x_2, x_3), \quad \text{(Eqn. 6)}$$

$$yL = y0\Big|_{\overline{X}} + \frac{\partial y}{\partial x_1}\Big|_{\overline{X}} (x_1 - \bar{x}_1) + \quad \text{(Eqn. 7)}$$

$$\frac{\partial y}{\partial x_2}\Big|_{\overline{X}} (x_2 - \bar{x}_2) + \frac{\partial y}{\partial x_3}\Big|_{\overline{X}} (x_3 - \bar{x}_3), \text{ and}$$

$$yL = V^*_{inv}(t) + K_1 \cdot V_{dc}(t) + K_2 \cdot V_{d\_filt}(t) + K_3, \quad \text{(Eqn. 8)}$$

where:

$$K_1 = \frac{V^*_{invo}}{V_{d\_filt\_o}} \quad \text{(Eqn. 9)}$$

$$K_2 = -V^*_{invo} \quad \text{(Eqn. 10)}$$

$$K_3 = -V_{dco} \cdot K_1 - V_{d\_filt\_o} \cdot K_2. \quad \text{(Eqn. 11)}$$

Figure 5:
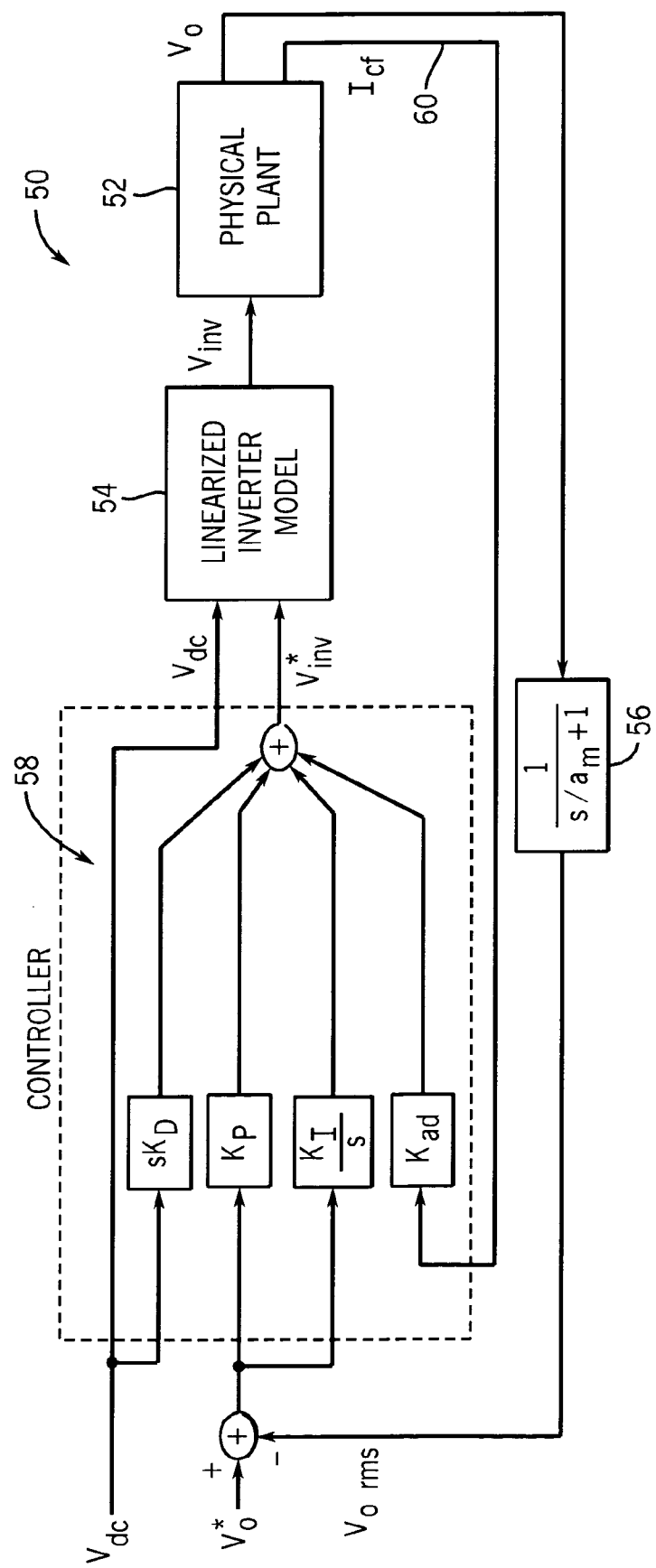
FIG. 5 is a schematic of the power conditioner illustrated in FIG. 1 in accordance with the present invention.

A block diagram of the motor drive system 50 is illustrated in FIG. 5. As shown, the system 50 includes the physical plant 52 (comprised of the LC filter, transformer, and load), the linearized inverter modulator, and power stage model 54, output voltage feedback sensor 56, and output loop controls 58. The outer control loop has a capacitor current feedback 60 for active damping ($I_{cf}$), a PI compensator on the output voltage RMS error ($K_P$, $K_I$), and a derivative gain ($K_D$) on the filtered DC bus voltage ($V_{d\_filt}$).

The RMS voltage sensor 56 was modeled as a low pass filter. The controller 58 achieves three major functions: (1) Active damping of the LC filter to ensure output voltage performance within total harmonic disturbance guidelines, (2) Regulating of load voltage under steady-state, and (3) Regulating load voltage under load current and DC bus voltage transients.

The active damping gain ($K_{ad}$) critically damps the natural resonance frequency of the LC filter. The outer loop voltage PI gains ($K_P$ and $K_I$) are tuned to provide command tracking at the fundamental frequency and not cause instability or load oscillations. The DC bus voltage derivative gain ($K_D$) improves the dynamic response of the controller to load steps.

The output LC filter blocks all but the system output frequency at 60 Hz. Its corner frequency is far below the inverter switching frequency to obtain low total harmonic distortion in the output voltage waveform. The $L_f/C_f$ ratio of the filter is such that no-load current going into the $C_f$ is less than 5% of the rated output current.

Figure 6:
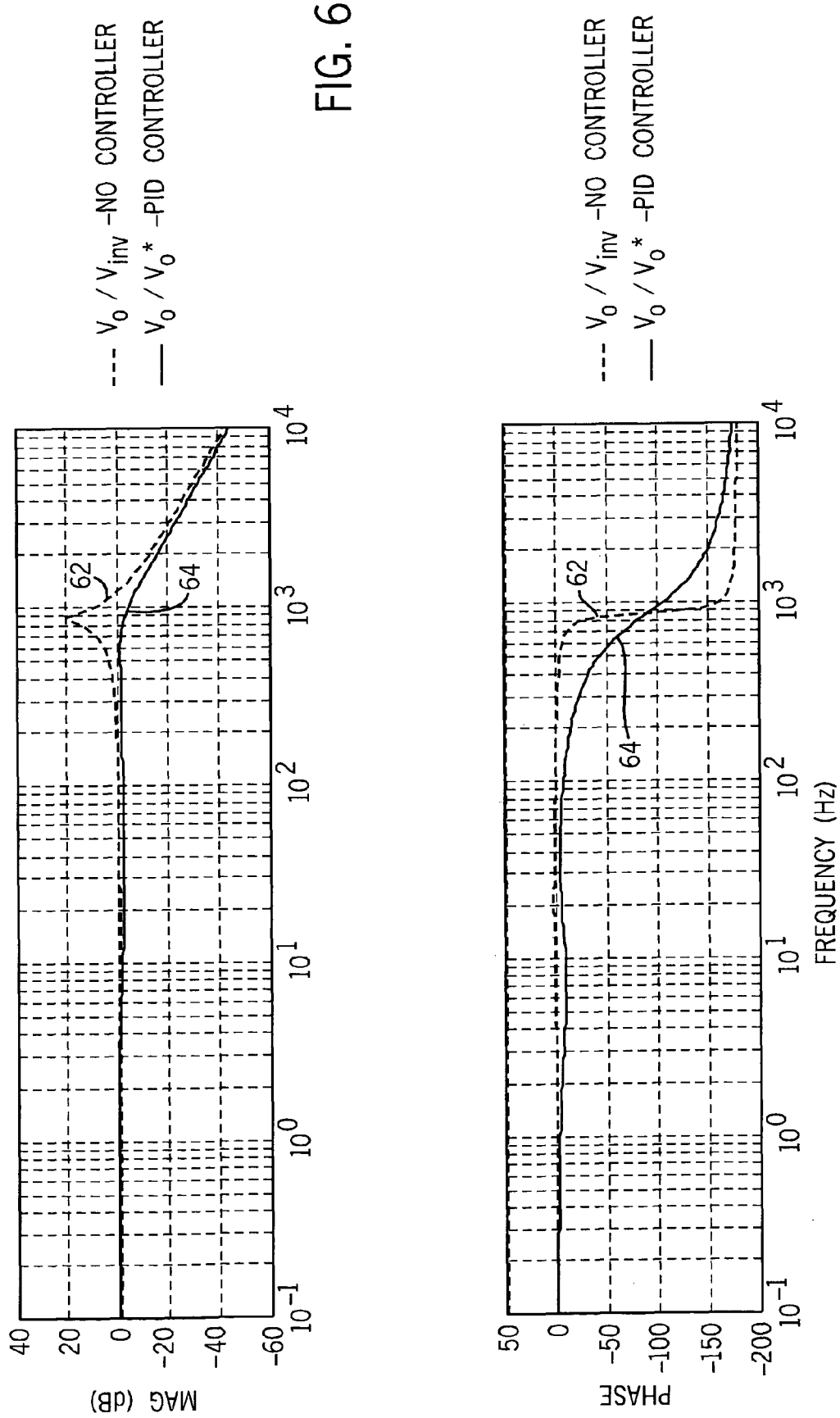
FIG. 6 is a series of command tracking load voltage transfer function profiles.
Figure 7:
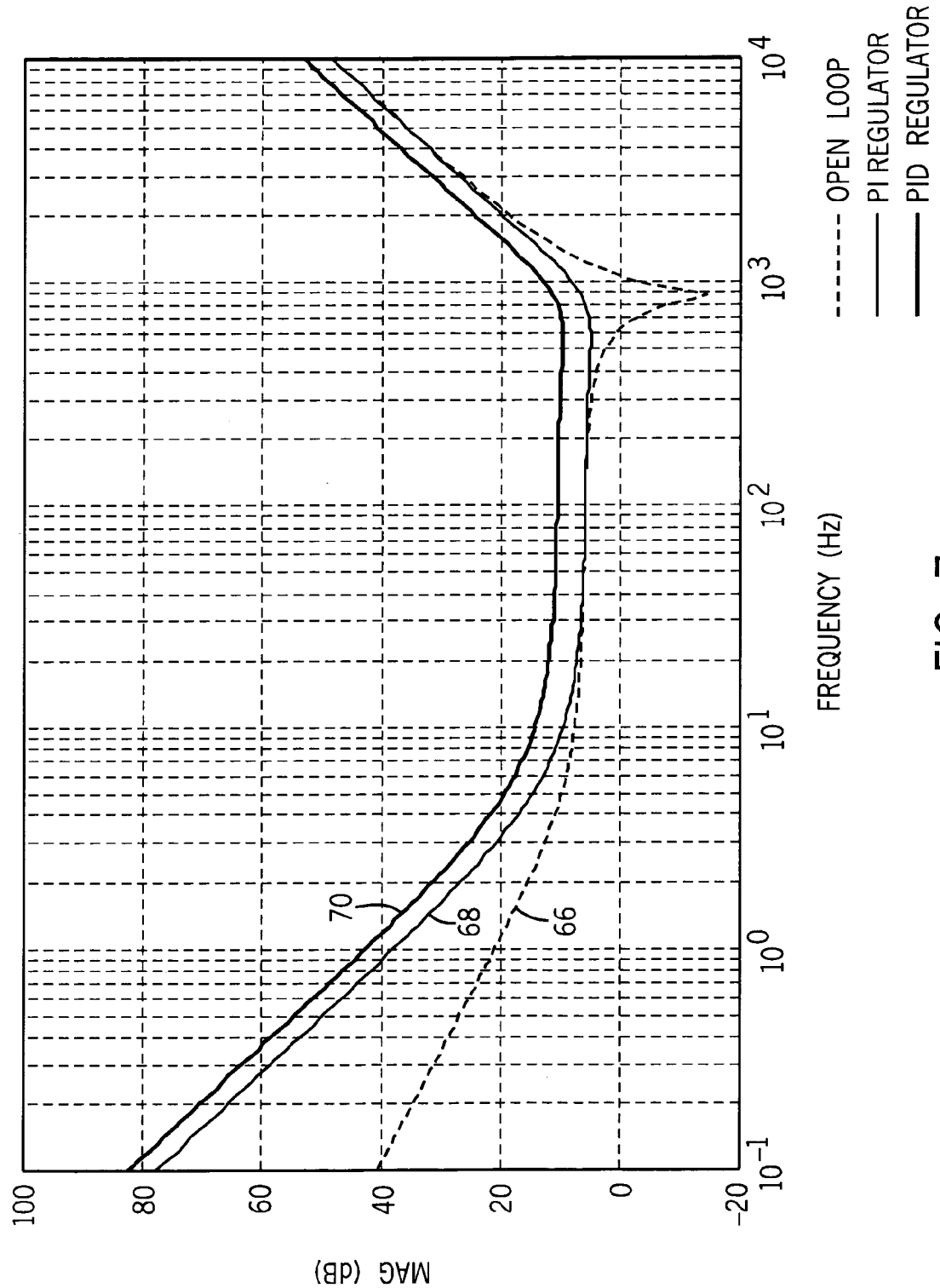
FIG. 7 is a series of DC bus disturbance rejection transfer function profiles.

The command tracking performance of the closed loop system is shown in FIG. 6. The initial open loop output transfer function 62, $V_o(s)/V_{inv}(s)$, shows that the plant transfer function contains a resonance at 1 kHz due to the output filter, and has non-unity gain at low frequency due to the resistance of the filter inductor and transformer leakage inductance. By introducing active damping and PI control gains, the resulting output transfer function 64 of $V_o(s)$ $V^*_o(s)$, shows that resonance is damped and the low frequency command tracking improved to −0.2 dB. The controller's effect on the DC voltage disturbance rejection $V_{DC}(s)/V_o(s)$ is shown in FIG. 7.

As shown, an open loop transfer function profile 66, PI controller with active damping gains transfer function profile 68, and PI controller with active damping gains plus a derivative gain on the DC bus voltage ($V_{DC}$) transfer function profile 70 were plotted. As illustrated, the addition of the PI controller has improved performance at low frequencies over the open loop response, but due to the low bandwidth of the RMS voltmeter, this is limited to approximately 10 Hz. Additionally, the active damping gain damps the 1 kHz resonance visible in the open loop transfer function. On the other hand, the addition of the DC bus derivative gain increases disturbance rejection across the frequency spectrum, thus reducing the affect of DC voltage transients on the load voltage.

The power conditioner illustrated in FIG. 1 is a sinusoidal voltage source that could be applied to linear or non-linear loads. To assess its performance under harmonic and transient loads, output current disturbance current rejection was performed.

Figure 8:
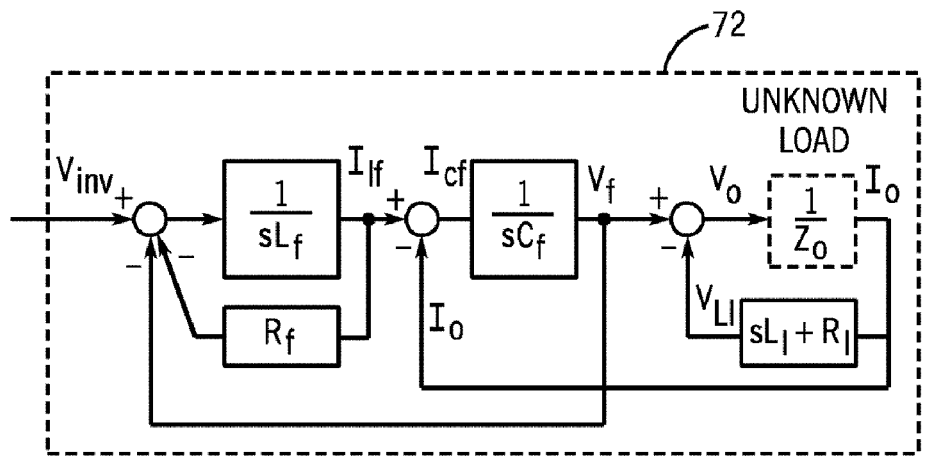
FIG. 8 is a schematic of a physical plant with unknown load according to the present invention.

A plant model 72 with an unknown load is illustrated in FIG. 8. The load current disturbance rejection transfer functions under open loop conditions ($V_{inv}$=0) and with the PID controller are derived in Eqn. 12.

$$\left.\frac{I_o}{V_o}\right|_{V_{inv}=0} = \frac{s^2 C_f L_f + s C_f R_f + 1}{-(s^3 C_f L_f L_t + s^2 C_f L_t R_f + s(L_t + L_f) + R_f)}. \quad \text{(Eqn 12)}$$

Figure 9:
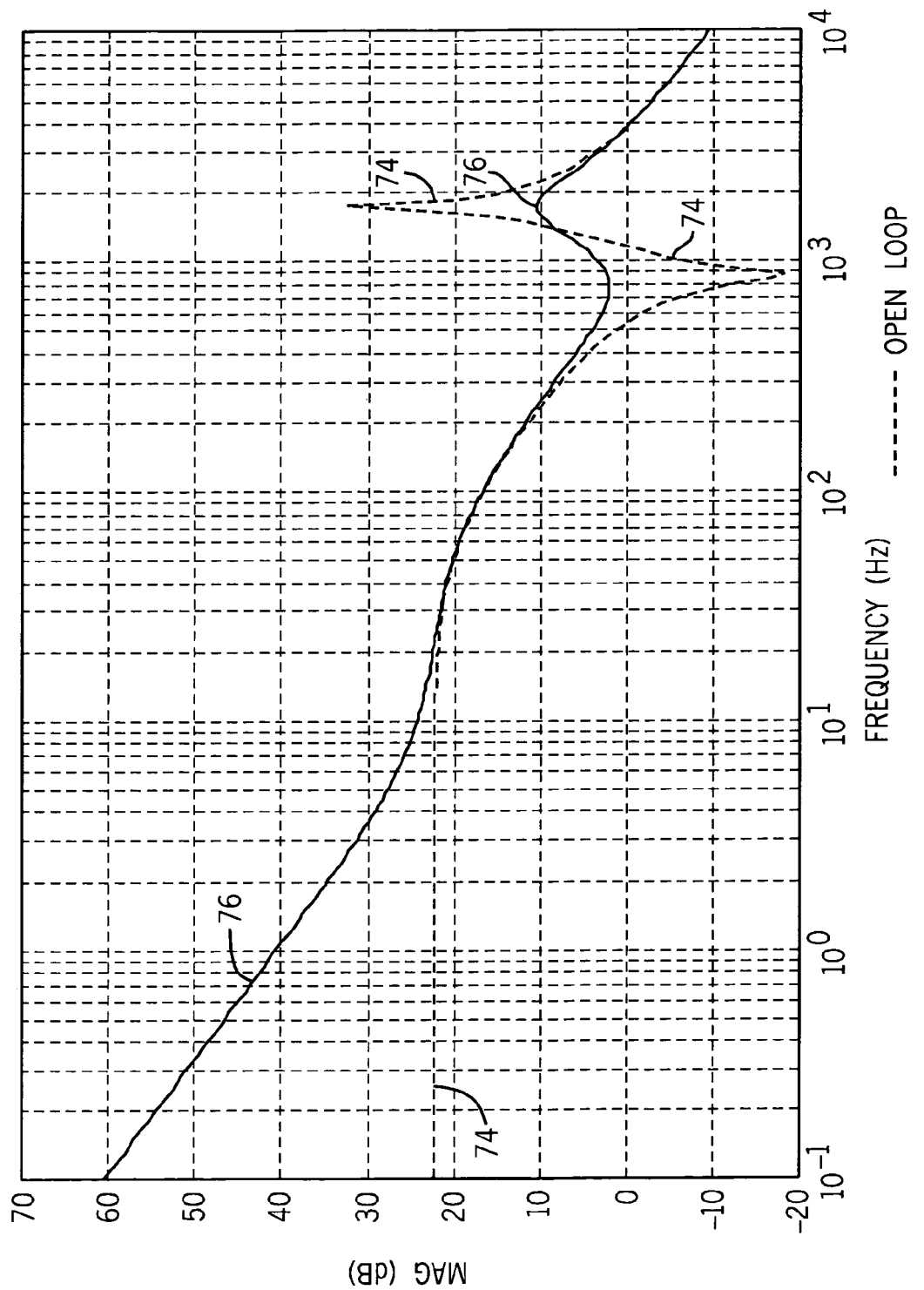
FIG. 9 is a series of $I_o/V_o$ disturbance rejection transfer function profiles.

The transfer function profiles are shown in FIG. 9. Specifically, an open loop profile 74 and a PID controller with action damping profile 76 are shown. As illustrated, the PID controller improves the disturbance rejection over the open loop case below the RMS meter bandwidth of 10 Hz.

Figure 10:
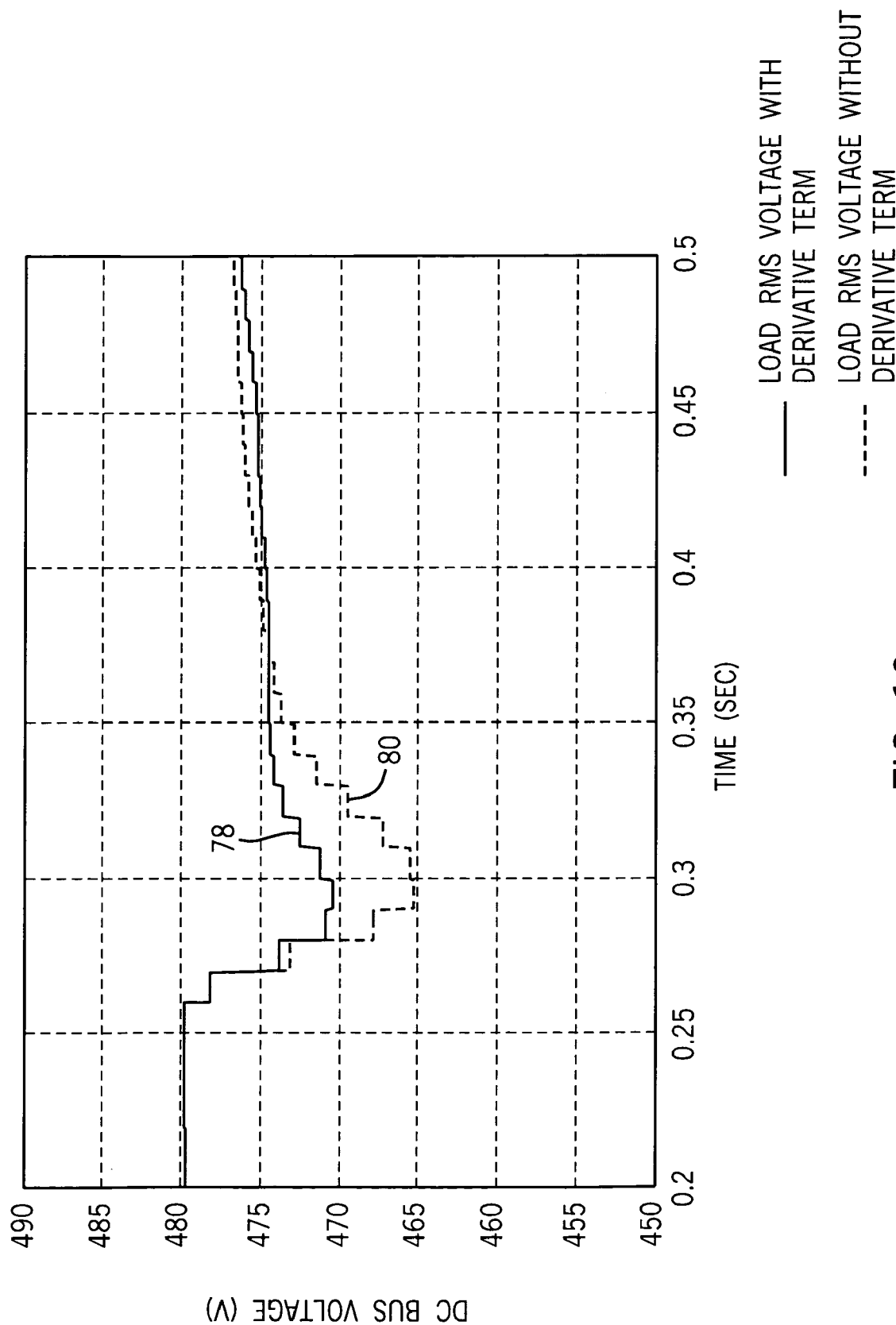
FIG. 10 illustrates results of a simulation of a 150 hp motor drive output RMS voltage versus a derivative term under a step load transient.
Figure 11:
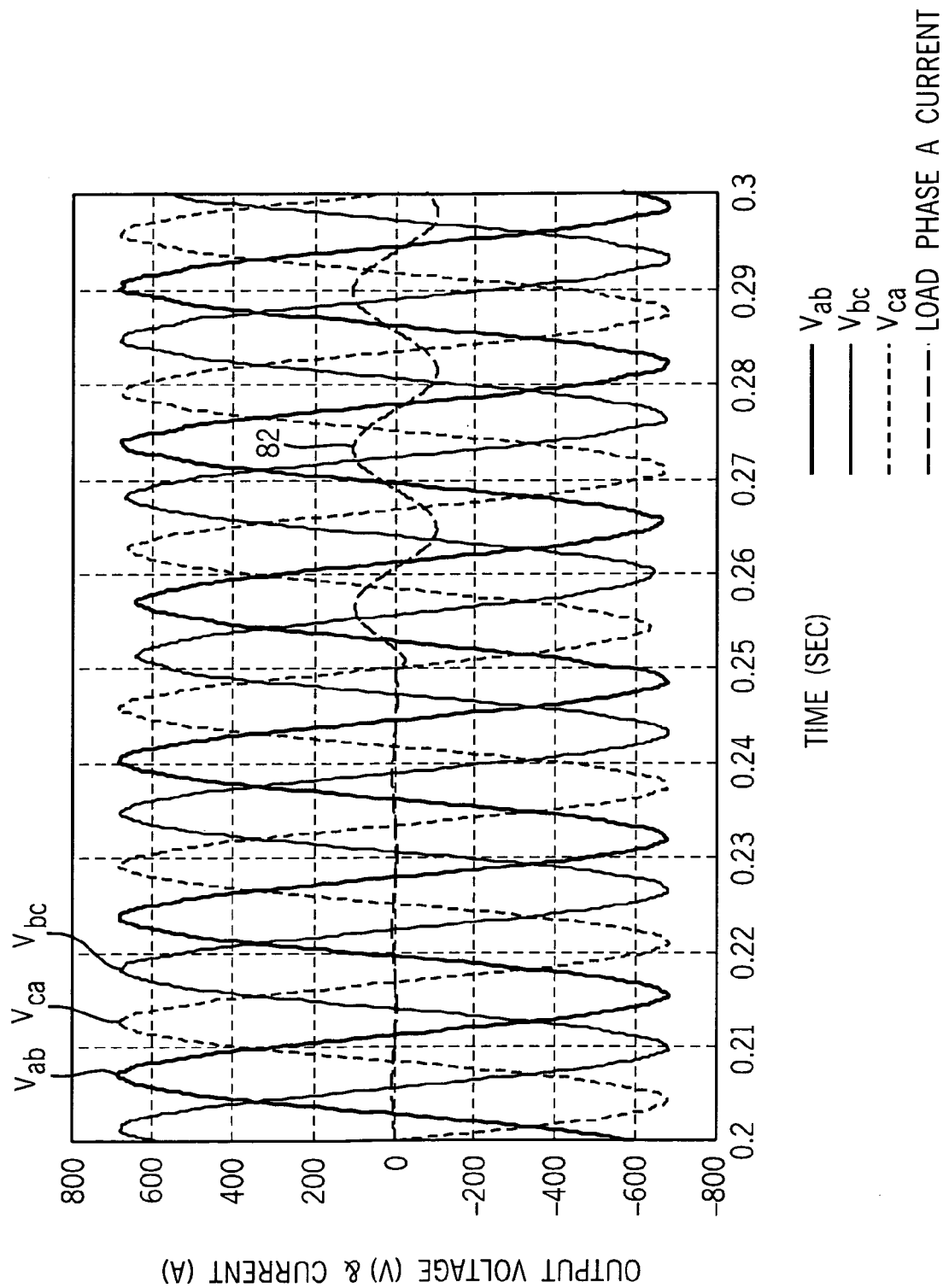
FIG. 11 illustrates results of a simulation of a 150 hp motor drive output line voltage and a given phase current under a step load transient.

Referring now to FIG. 10, the effectiveness of the derivative term based on the DC bus voltage signal is illustrated. As shown, the load voltage with the derivative term 78 is brought up to about 5V RMS as compared to the case without the derivative term 80. As shown in FIG. 11 in the load phase number current waveform 82, system stability is maintained with a fast output voltage recovery time of about two cycles at 60 Hz. The graphs illustrated in both FIGS. 10 and 11 were derived using a 150 hp, 460V, 60 Hz motor drive subjected to a step load of 0-60 kW.

Figure 12:
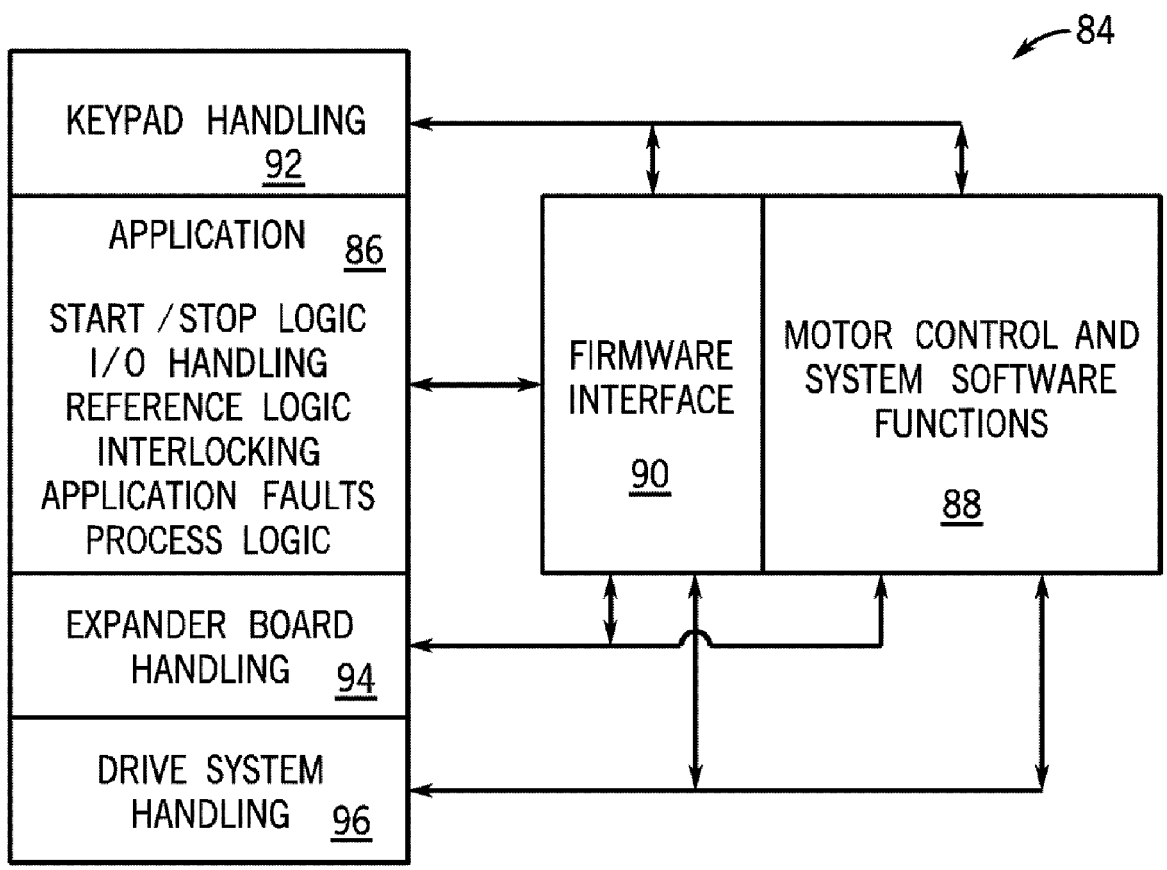
FIG. 12 is a schematic illustrating power conversion software structure for a PID controller according to the present invention.

As described above, the present invention includes a closed loop PID controller that controls a series of IGBTs in response to detected changes in DC bus voltage. Power conversion software structure for the PID controller in compliance with the IEC61131-3 standard is illustrated in FIG. 12. As shown, the controller 84 comprises two software layers: an applications layer 86 and a system layer 88. These two layers are developed independently and are integrated together by defining shared variables therebetween in accordance with the IEC61131-3 standard. The programming languages include two textual languages and three graphical languages. The applications layer languages include: Instruction List (IL), Structured Text (ST), Functional Block Diagram (FBD), Ladder Diagram (LD), and Sequential Function Chart (SFC). As further illustrated in FIG. 12, the applications layer and the system layer interface with one another via a firmware interface 90 that allows the motor control and system software functions to interface with keypad handling 92, expander board handling 94, and drive system handling 96.

Figure 13:
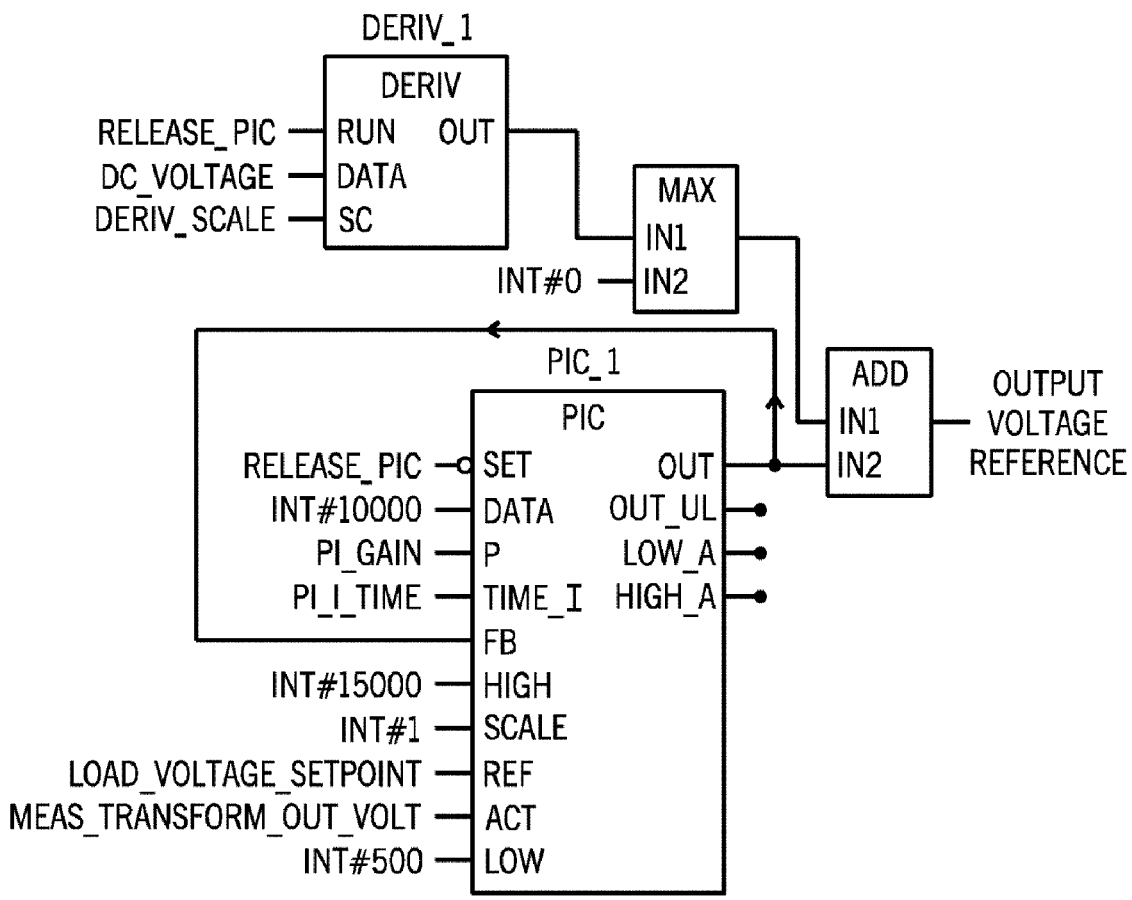
FIG. 13 is a block diagram of a closed loop controller according to the present invention.

FIG. 13 illustrates how the closed loop PID controllers are implemented using the FBD in the application software layer. The functional block diagrams include a derivative block: DERIV_1, a derivative limiter block: MAX, a PI regulator block: PIC_1, and a summation block: ADD. The input and output signals of each block are defined as Arithmetic or Boolean data types, etc. The variables of Release_PIC_PI_Gain, PI_I_Time, LoadVoltageSetpoint are defined in a user display (not shown) as input parameters. The variable: Deriv_scale (SC) has a negative value so when the DC bus voltage droops, the correction term is positive. The limiter block: MAX limits the allowed correction value only in the positive direction. Each block executes at a predetermined rate. The variables MeasTransformOutVolt and DCVoltage are measured quantities through analog-to-digital converters. The variable OutputVoltageReference is computed and sent from the application layer software layer to the system layer software for commanding the pulse width modulation (PWM) gate signals for the inverter 24 (FIG. 1).

The application layer software is decoupled from the system layer software and this makes it flexible to develop new applications, as long as the system layer software meets the application needs.

The results from the analytical model presented in the previous sections were verified on a laboratory test-bed built around a 150 hp, 460V, 60 Hz variable speed motor drive. The test configuration consisted of the motor drive, an output three-phase LC filter, a 75 kVA drive isolation step-up transformer, and a controllable load bank. The test results confirm the theoretical analysis and the simulation results with the load voltage THD less than 3%.

Figure 14:
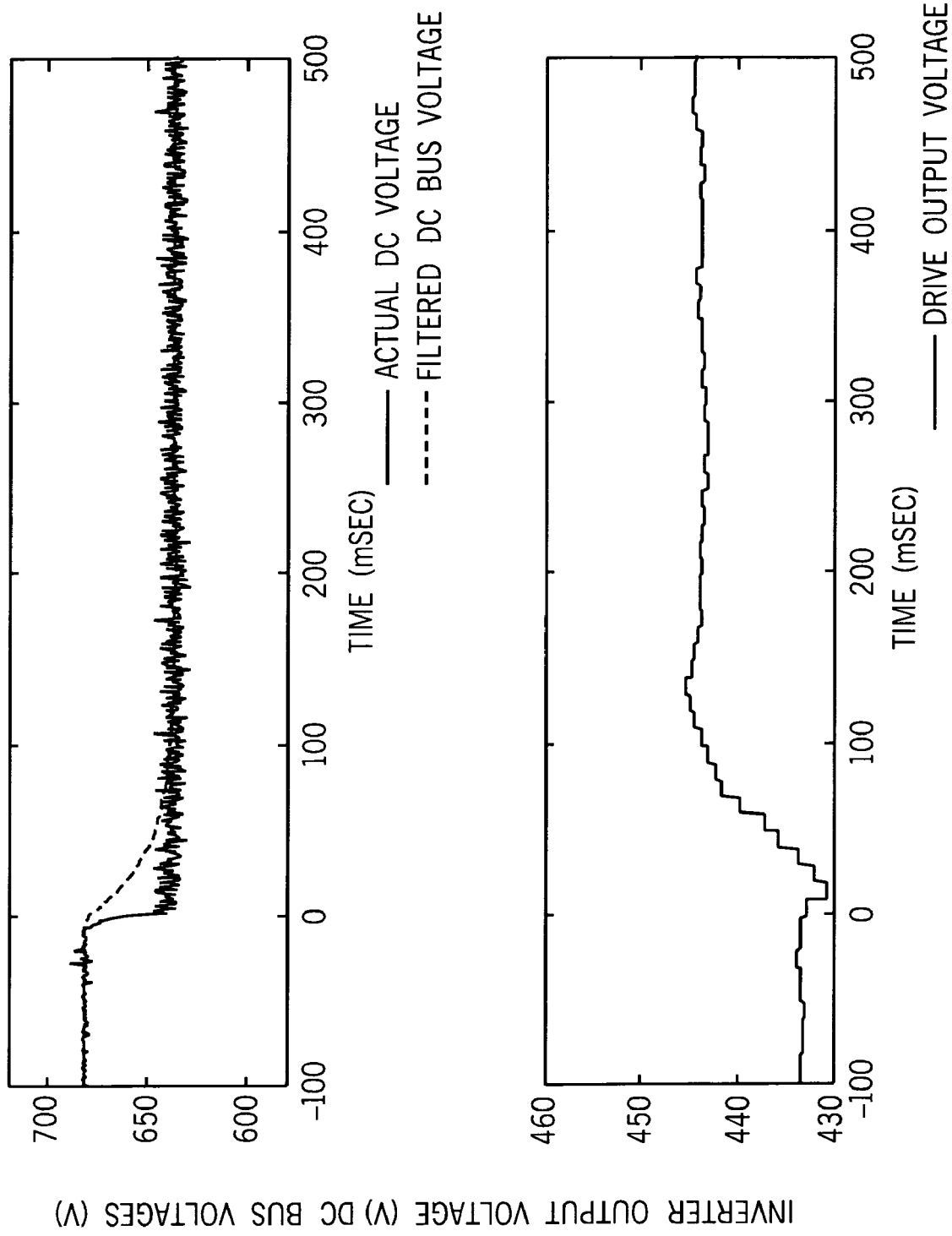
FIG. 14 illustrates experimental results of DC bus voltages and inverter output transient responses according to the present invention.
Figure 15:
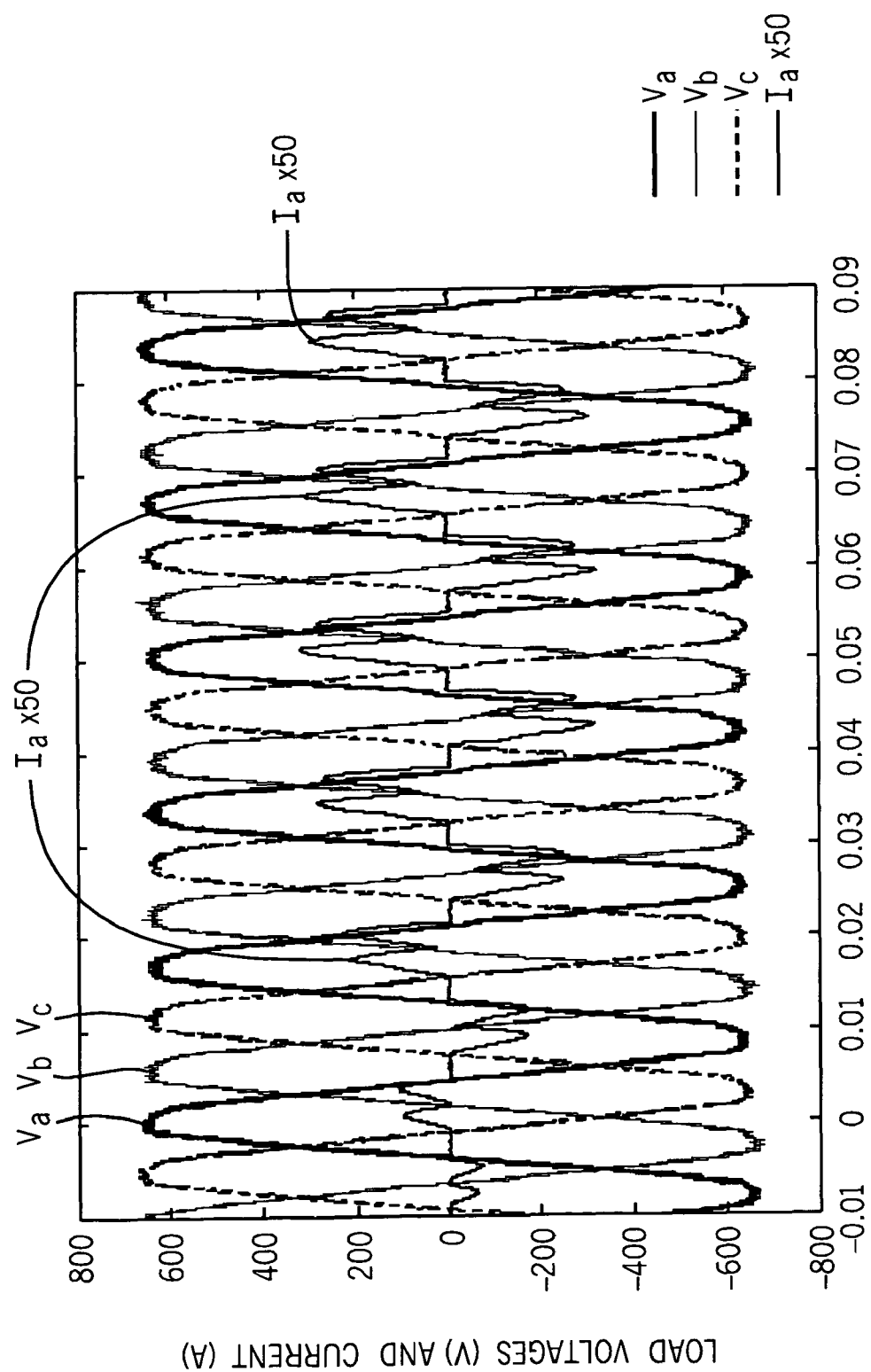
FIG. 15 shows a series of waveforms setting forth experimental non-linear load voltage as a function of current transient response.

Specifically, three-phase, line-to-line load voltage signals were acquired during a step load transient when a 60 kW load was suddenly applied from a no load condition. The resulting waveforms were similar to the simulated results captured in the waveforms of FIG. 11. Additionally, the waveforms shown in FIG. 14 illustrate that the derivative term in the PID controller during testing responded quickly to increase the inverter output voltage and compensated for the DC bus voltage drop due to the step load change. Additionally, as shown in FIG. 15, due to load system bandwidth, a couple of cycles were needed before the load current reached a steady-state. The output voltage remained fairly stable during the non-linear step change.

As described, the present invention includes a cost-effective, high performance power conditioner utilizing a motor drive for a non-motor load. In this regard, the present invention is particularly well-suited for high performance loads, such as medical imaging scanners. The high performance resides in the load voltage regulation of ±1% in steady state with less than 3% total harmonic distortion, ±0.1 Hz with fixed output frequency (60 Hz), and fast dynamic step load response. A PID controller with a unique derivative term based on the filtered DC bus voltage provides a much improved dynamic step load response. In this regard, the motor drive responds quickly to transient load conditions. Analytic and simulation results were confirmed by experimental verification using a system comprising a 150 hp adjustable speed motor drive, a three-phase output LC filter, and a 75 kV low impedance step-up isolation transformer. Software implementation of the present invention is compliant with the IEC61131-3 standard.

Therefore, the invention includes a motor drive to control power delivery to a load. The motor drive includes a power input and a DC bus connected to the power input. At least one switch is connected to the DC bus. The motor drive further includes a power output connectable to a load. A controller is connected to the DC bus and controls switching of the at least one switch to maintain near steady-state at the load in response to changes in voltage at the DC bus.

A power conditioner is also disclosed to supply conditioned power to a load. The power conditioner has a rectifier bridge to convert an AC power input to DC power and provide a DC bus voltage. An inverter is connected to the DC bus voltage. A filter filters the inverter output and feeds the filtered output to a non-motor load. The power conditioner also has a PID controller that receives feedback of the DC bus voltage and regulates the inverter to maintain near steady-state at the non-motor load in response to transient load conditions.

The invention also includes a method of regulating power to a load. The method includes detecting a change in voltage across a DC bus of a motor drive and dynamically controlling switching of a switch array of the motor drive in response to a detected change in voltage across the DC bus such that load voltage regulation is ±1% in steady-state with less then 3% total harmonic distortion.

The present invention has been described in terms of the preferred embodiment, and it is recognized that equivalents, alternatives, and modifications, aside from those expressly stated, are possible and within the scope of the appending claims.

What is claimed is:

1. A motor drive comprising:
   a power input;
   a DC bus connected to the power input;
   at least one switch connected to the DC bus;
   a power output connectable to a load; and
   a controller connected to the DC bus and configured to control switching of the at least one switch to maintain near steady-state at the load in response to changes in voltage at the DC bus.

2. The motor drive of claim 1 wherein the power output is connectable to a non-motor load.

3. The motor drive of claim 1 further comprising a rectifier configured to convert power received by the power input from AC to DC and supply DC power to the DC bus.

4. The motor drive of claim 1 further comprising a voltage sensor connected to measure voltage across the DC bus and provide voltage feedback to the controller.

5. The motor drive of claim 1 wherein the power input is configured to receive a 480VAC input.

6. The motor drive of claim 1 wherein the power output is connectable to a non-linear load.

7. The motor drive of claim 6 wherein the non-linear load includes a medical imaging device.

8. The motor drive of claim 1 wherein the controller is further configured to control switching of the at least switch to provide a load voltage regulation of ±1% in steady-state with less than 3% total harmonic distortion and ±0.1 Hz with fixed output frequency.

9. The motor drive of claim 1 wherein the controller includes a PID controller.

10. The motor drive of claim 1 wherein the at least one switch includes six IGBTs.

11. A power conditioner to supply conditioned power to a non-motor load, the power conditioner comprising:
    a rectifier bridge to convert an AC power input to DC power and provide a DC bus voltage;
    an inverter connected to receive the DC bus voltage;
    a filter connected to the inverter to feed an output of the inverter to the non-motor load; and
    a PID controller that receives feedback of the DC bus voltage and regulates the inverter to maintain near steady-state at the non-motor load in response to transient load conditions.

12. The power conditioner of claim 11 further comprising a step-up transformer connected to the filter and designed to step up a voltage of the modulated DC bus voltage and feed the stepped-up voltage to the non-motor load.

13. The power conditioner of claim 11 wherein the load is a non-linear load.

14. The power conditioner of claim 11 further comprising an RMS voltmeter designed to provide feedback to the PID controller regarding load voltage.

15. The power conditioner of claim 11 wherein the inverter includes a plurality of IGBTs and anti-parallel diodes.

16. The power conditioner of claim 11 wherein the PID controller is further configured to determine a transient load condition from changes in DC bus voltage.

17. The power conditioner of claim 11 further comprising a voltage sensor connected across a DC bus electrically present between the rectifier bridge and the switch array.

18. A method of regulating power to a load comprising the steps of:
    detecting a change in voltage across a DC bus of a motor drive; and
    dynamically controlling switching of a switch array of the motor drive in response to a detected change in voltage across the DC bus such that load voltage regulation is ±1% in steady-state with less than 3% total harmonic distortion.

19. The method of claim 18 further comprising the step of monitoring DC bus voltage with a voltage sensor and detecting a change in DC bus voltage from feedback provided by the voltage sensor.

20. The method of claim 18 further comprising the step of detecting a transient load condition based on changes in DC bus voltage.

21. The method of claim 18 further comprising the step of dynamically controlling switching of the switch array with a PID controller.

22. The method of claim 18 wherein the motor drive is an ASD motor drive and the load is a non-linear load.

23. The method of claim 22 wherein the non-linear load is a medical imaging scanner.

24. The method of claim 23 wherein the medical imaging scanner is one of a CT scanner and an MR scanner.

25. The method of claim 18 further comprising the step of receiving feedback of load voltage from an RMS voltmeter.

26. A power conditioner comprising:

an adjustable speed drive (ASD) having an inverter configured to receive a DC bus voltage and deliver an output voltage;

a transformer configured to receive the output voltage of the inverter and provide a load voltage to a non-motor load;

a voltage sensor connected to sense the DC bus voltage and provide feedback thereof; and a controller connected to control at least one switch of the inverter, the controller programmed to:

input the DC bus voltage feedback from the voltage sensor;

process the DC bus voltage feedback to provide a derivative term;

forecast changing load conditions from the derivative term; and control the at least one switch of the inverter to maintain a near stead-state load condition.

\* \* \* \* \*